(12) United States Patent
McClure et al.

(10) Patent No.: US 7,327,544 B2
(45) Date of Patent: Feb. 5, 2008

(54) BATTERY PROTECTION DEVICE

(75) Inventors: David C. McClure, Carrollton, TX (US); William D. Bishop, Irving, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 567 days.

(21) Appl. No.: 10/890,964

(22) Filed: Jul. 14, 2004

(65) Prior Publication Data

US 2005/0134229 A1 Jun. 23, 2005

Related U.S. Application Data

(60) Provisional application No. 60/530,574, filed on Dec. 18, 2003.

(51) Int. Cl.
*H02H 3/20* (2006.01)
*H02H 9/08* (2006.01)
*H02J 7/00* (2006.01)

(52) U.S. Cl. ............... 361/91.5; 361/93.9; 320/134
(58) Field of Classification Search ........... 320/134; 361/91.5, 93.9
See application file for complete search history.

(56) References Cited

U.S. PATENT DOCUMENTS

| | | | | |
|---|---|---|---|---|
| 4,644,247 A | * | 2/1987 | Burmenko | 320/138 |
| 5,150,033 A | * | 9/1992 | Conway | 320/112 |
| 5,635,821 A | * | 6/1997 | Smith | 320/103 |
| 5,736,833 A | * | 4/1998 | Farris | 320/163 |
| 5,896,025 A | * | 4/1999 | Yamaguchi et al. | 320/134 |
| 5,929,593 A | * | 7/1999 | Eguchi | 320/139 |
| 5,963,019 A | * | 10/1999 | Cheon | 320/150 |
| 5,994,875 A | * | 11/1999 | Lee | 320/132 |
| 6,252,379 B1 | * | 6/2001 | Fischl et al. | 320/134 |
| 6,734,652 B1 | * | 5/2004 | Smith | 320/163 |
| 2001/0021092 A1 | * | 9/2001 | Astala | 361/90 |
| 2002/0153865 A1 | * | 10/2002 | Nelson et al. | 320/152 |
| 2004/0080892 A1 | * | 4/2004 | Popescu-Stanesti et al. | 361/93.9 |

* cited by examiner

*Primary Examiner*—Michael Sherry
*Assistant Examiner*—Tien Mai
(74) *Attorney, Agent, or Firm*—Lisa K. Jorgenson; Renee Michelle Leveque

(57) ABSTRACT

A battery protection structure is described. The structure provides battery overcharging protection while allowing for minimal battery voltage drop during normal battery operation. One resistance element sets voltage drop during normal operation, and the sum of two resistance elements sets the maximum battery charging current which will be allowed. The structure provides protection against single component failures.

14 Claims, 2 Drawing Sheets

BATTERY PROTECTION DEVICE

PRIORITY CLAIM

This application claims priority from the provisional U.S. patent application titled "BATTERY PROTECTION SCHEME", filed Dec. 18, 2003 and identified by Ser. No. 60/530,574, which is hereby incorporated herein by reference.

BACKGROUND

The use of battery backup power for electronics devices in the event of primary power unavailability has been in use for decades. In general terms, an output voltage of a power section is required for operation of circuitry in equipment. This output voltage is normally derived from the primary power source in normal operation, which may be, for example, DC derived from an AC source. If the primary power source is for some reason unavailable, the output voltage is then derived from an internal battery source as part of a backup power mode. When primary power becomes available again operation is switched back to the primary power source. This switchover from primary power to battery power, and vice versa, is controlled by a supervisory circuit in the power section of the device.

The battery may be charged when primary power is available, and the device is operating in the normal operating mode. The amount of battery charging current must be controlled or limited, as overcharging may result in the battery overheating, becoming a fire hazard, and reducing battery life. The current UL (Underwriters Laboratory) recommendation for battery overcharging protection involves a resistor in series with the battery and the charging source. While this resistor will limit charging current into the battery, it will produce a voltage drop across the resistor during battery operation. This voltage drop is often in conflict with other requirements, such as minimal operating voltage requirements for device circuits that receive battery power. An excessive voltage drop may make following circuitry inoperable if its voltage requirements are not met.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
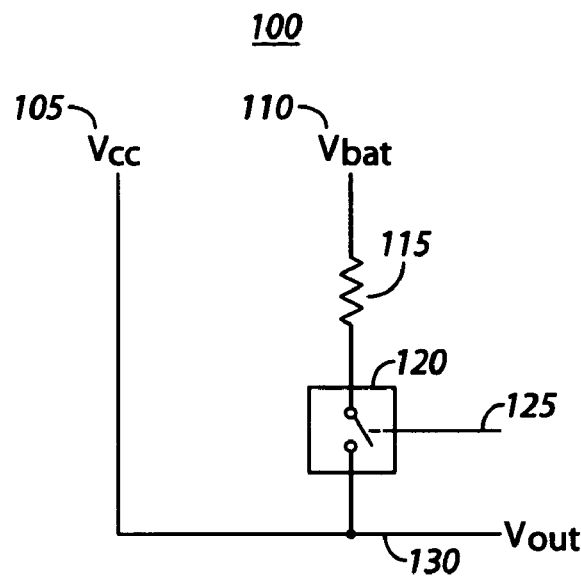
FIG. 1 is an exemplary simplified block diagram of a prior art battery switchover system.

A structure for minimizing voltage drop across a battery series resistor while providing battery charging overcurrent protection is presented, in accordance with certain embodiments of the present invention.

Many variations, equivalents and permutations of these illustrative exemplary embodiments of the invention will occur to those skilled in the art upon consideration of the description that follows. The particular examples above should not be considered to define the scope of the invention. For example discrete circuitry implementations and integrated circuit implementations may be formulated using techniques of the present invention. Another example would be an implementation of the supervisory functional elements across a system. A still further example would be implementing crossover functions in software, such as DSP.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

For purposes of this document, the exact mechanical and electrical parameters of equipments are unimportant to an understanding of the invention, and many different types of electrical and mechanical components may be utilized without departing from the spirit of the invention. An example is that components utilized in the circuit may differ as to value, power rating, and physical size. This document uses generalized descriptions by way of example only. Many variations for these constituent items are possible without departing from the spirit and scope of the invention.

Refer to FIG. 1, which is an exemplary simplified block diagram of a prior art battery switchover system. Vcc input 105 during normal operation supplies power to the load (not shown) which is connected to Vout 130, and Vbat input 110 does not supply current through resistor 115 and switch 120 to Vout 130 since switch 120 is held open by control input 125 during normal operation. Control input 125 is often a logic signal based upon related systems functions which monitor system electrical performance, and control input 125 is utilized to open or close switch 120. If the main power source becomes unavailable, the circuit goes to a backup mode during which Vcc input 105 is disabled, switch 120 is closed, and load power is continued utilizing the battery Vbat input 110. One failure mode for this configuration is when switch 120 fails in a shorted state. Under that condition, with Vcc input 105 supplying normal operational power to the load, the battery will be charged continuously at a high rate of current which can damage the battery, represent a fire hazard, and reduce battery life.

One answer is to increase the value of resistor 115, so that worst case battery charging is limited to a safe value. A disadvantage of this is that a larger resistance means increased battery backup path voltage drop when the load is being supplied from the battery alone. The present invention describes a structure that allows independent selection of resistance values which control backup battery voltage drop and battery overcharging protection.

Figure 2:
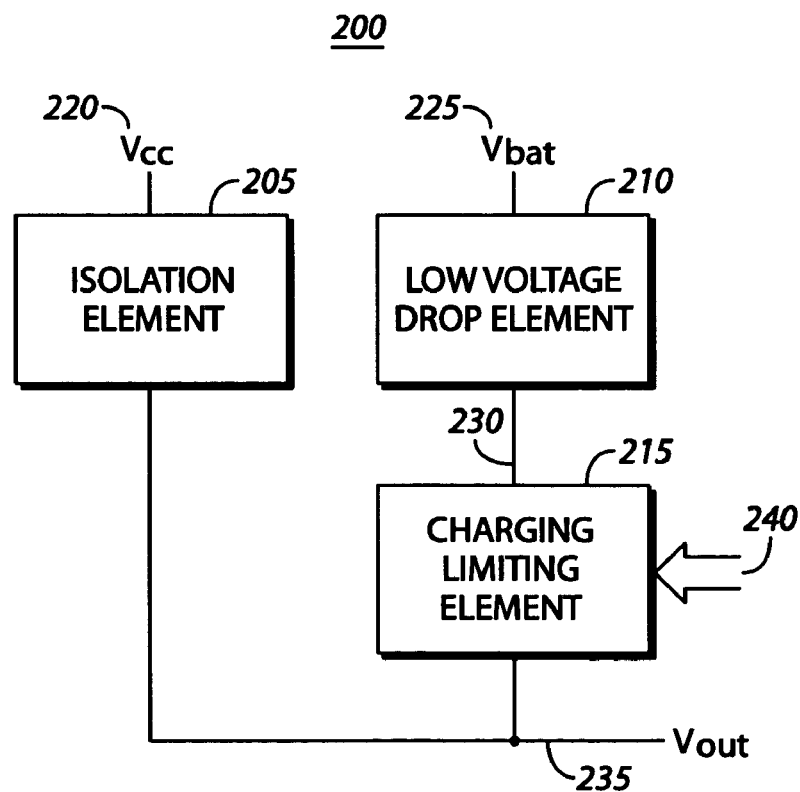
FIG. 2 is an exemplary simplified block diagram of a battery switchover structure, in accordance with certain embodiments of the present invention.

Refer to FIG. 2, which is an exemplary simplified block diagram of a battery switchover structure, in accordance with certain embodiments of the present invention. In the normal mode, the combination of Vcc 220 and isolation element 205 form a power source which is capable of powering Vout 235 and attached load (not shown), and which may charge Vbat 225 through charging limiting element 215, interconnect 230, and low voltage drop element 210. Control inputs 240 are one or more inputs which control the state of operation of charging limiting element 215 to allow for normal, backup, and charging operations. Vbat 225 is deployed to power Vout 235 and associated load in the event that Vcc 220 and isolation element 205 fail to provide acceptable voltage to Vout 235. The range of acceptable Vout 235 is determined by system design. If the voltage delivered to Vout 235 by Vcc 220 and isolation element 205 is an unacceptable value, Vout 235 and associated load are powered by Vbat 225 (this is the backup mode) through low voltage drop element 210, interconnect 230, and charging limiting element 215. The voltage delivered by Vcc 220 and isolation element 205 may be deemed unacceptable if it is too high, too low, or is not available, or is degraded such as by noise. The acceptable/unacceptable decision is determined by system functions unrelated to the present invention. The exact nature of Vcc 220, isolation element 205, Vbat 225, loads connected to Vout 235, and the supporting system are not relevant to the present invention.

Isolation element 205 serves to disconnect Vout 235 from unacceptable power which could be delivered by Vcc 220 and isolation element 205. Isolation element 205, when in the disconnect mode, would present a high series impedance between Vcc 220 and Vout 235. Isolation element 205 may be a relay, a semiconductor switch, a diode, a mechanical switch, or any other device which implements the required isolation function. Although isolation element 205 is not a part of the present invention, the foregoing description of the functionality it provides aids in understanding the present invention.

When backup power is being supplied by Vbat 225, the actual voltage delivered to Vout 235 is reduced by the voltage drops in low voltage drop element 210 and charging limiting element 215. When Vbat 225 is being charged, the charging current is limited by the resistances (in the charging direction) of charging limiting element 215 and low voltage drop element 210. It is desired that the total resistance in the backup mode, which is the sum of the resistance of low voltage drop element 210 and charging limiting element 215, be as low as possible. In the Vbat 225 charging mode, the charging current is limited by the sum of the resistance of charging limiting element 215 and the resistance of low voltage drop element 210, both in the charging direction. In those applications which require a large resistance for charging limiting and a low value of backup voltage drop, there is an inherent conflict.

The present invention provides for bidirectional resistance characteristics for charging limiting element 215. In the backup direction resistance is very low, but in the charging direction its resistance may be high. It is thus possible to provide minimal voltage drop between Vbat 225 and Vout 235 when in the backup mode, while providing for safe currents into Vbat 225 when in the charging mode.

Figure 3:
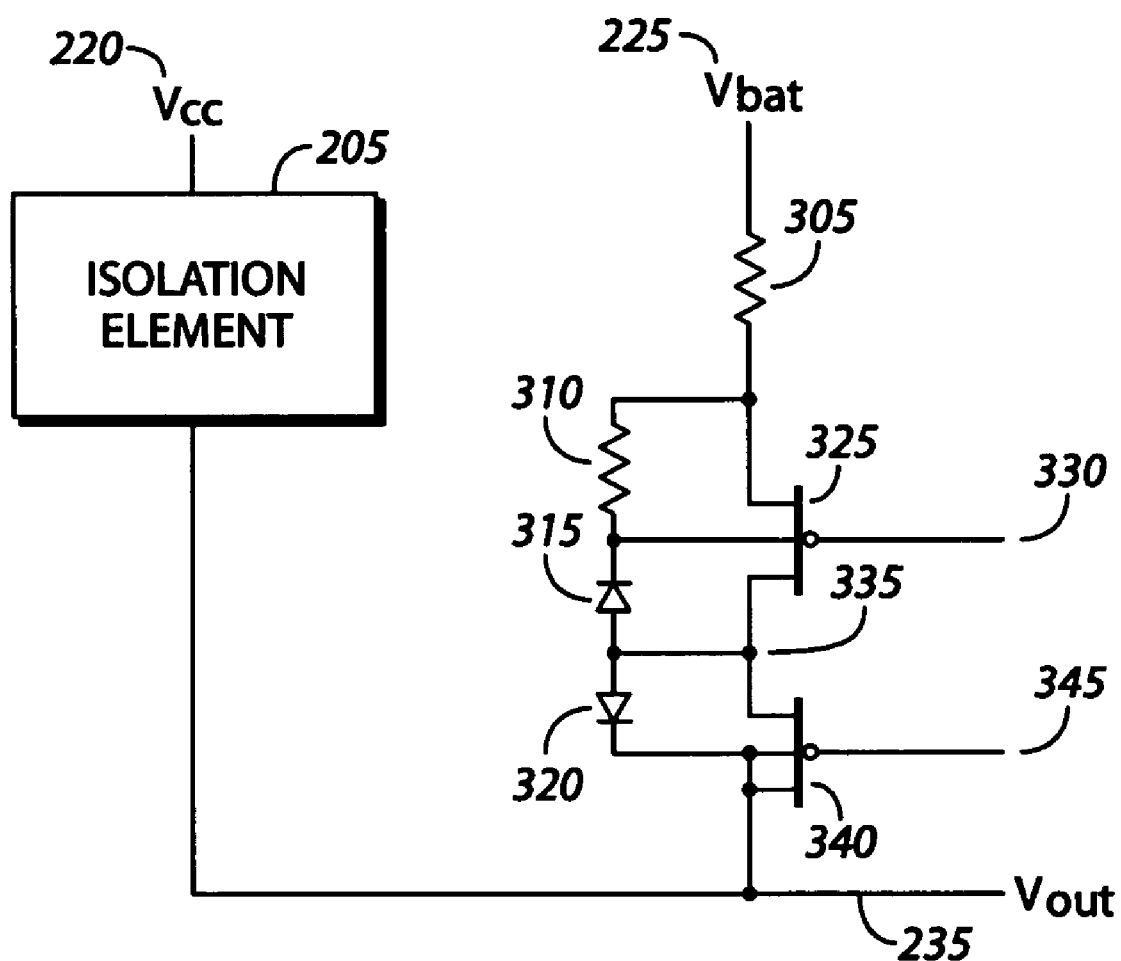
FIG. 3 is an exemplary simplified circuit diagram of a battery switchover device, in accordance with certain embodiments of the present invention.

Refer to FIG. 3, which is an exemplary simplified circuit diagram of a battery switchover structure, in accordance with certain embodiments of the present invention. The combination of Vcc 220 and isolation element 205 is the source from which normal mode power for Vout 235 is derived, as discussed previously. If the voltage available from this source is unacceptable, backup power is delivered by Vbat 225 which is the backup mode, also previously discussed. The path for battery-supplied backup power is from Vbat 225 through resistor 305, transistor 325, interconnect 335, and transistor 340 to Vout 235. In the backup mode transistor 325 is held in the shorted condition by control input 330, and transistor 340 is held in the shorted condition by control input 345. Control input 330 and control input 345 are derived from a supervisory circuit, not shown, which functions to monitor voltage conditions and control the states of transistor 325 and transistor 340, as appropriate and as dictated by system requirements. The supervisory circuit is not shown because it is not relevant to an understanding of the present invention. Resistor 305 is the only voltage dropping element in the forward path when Vbat 225 supplies operational power to Vout 235 in the backup mode, as the shorted resistances of transistor 325 and transistor 340 are very low. Resistor 305 may be made a low value, so that forward voltage drop is minimal during backup operation.

In series with the low voltage drop element, resistor 305, are several devices that together function as a battery charging limiting element; in this exemplary embodiment the devices that work in cooperation to limit battery charging current include resistor 310, transistor 325, transistor 340, and diode 315. If transistor 325 is open and transistor 340 is shorted, the battery will be charged through shorted transistor 340, diode 315, resistor 310, and resistor 305. Battery charging by this means is available during the normal mode of operation if desired. Resistor 310 may then be selected to be a value that limits battery charging current, as the battery will charge through the sum of resistor 310 and resistor 305. This allows for a larger resistance to limit battery charging (the sum of resistor 310 and resistor 305), while allowing a low value of resistance (resistor 305) in the battery backup forward path to achieve low voltage drop. Diode 320 may be the parasitic diode of transistor 340, and diode 315 may be the parasitic diode of transistor 325. For charging, transistor 340 is held shorted by control input 345, and transistor 325 is held open by control input 330. The charging path is through transistor 340, diode 315, resistor 310, and resistor 305 as previously stated.

This bidirectional resistance functionality solves the problem of providing low voltage drop between Vbat 225 and Vout 235 in the backup mode, and high resistance to limit Vbat 225 charging current in the charging mode.

The states for normal operation are that transistor 325 is held in the open state by control input 330, and transistor 340 is held in the open state by control input 345. Of interest is inadvertent battery charging in normal mode if a circuit component fails. If transistor 340 fails in a shorted condition, battery overcharging is prevented by the sum of resistor 310 and resistor 305. If transistor 340 fails in an open state, operation is not affected. If control input 345 becomes stuck such that transistor 340 is shorted, overcharging is also prevented by the sum of resistor 310 and resistor 305. If control input 345 fails such that transistor 340 is open, operation is not affected in terms of overcharging. Conversely, if transistor 325 fails in the shorted condition overcharging of Vbat 225 is prevented because transistor 340 is open. If transistor 325 fails in the open state, overcharging will not occur. If control input 330 is stuck such that transistor 325 is shorted, overcharging of the battery is prevented because transistor 340 is maintained in the open condition by control input 345. If control input 330 is stuck such that transistor 325 is held open, operation does not change. If diode 320 fails in a shorted state, overcharging of Vbat 225 is prevented by the series combination of resistor 310 and resistor 305. If diode 320 fails in an open state, operation is not adversely affected. If diode 320 fails in a shorted condition, it is equivalent to transistor 340 failing shorted, and is discussed above. Diode 315 failing shorted is equivalent to transistor 340 failing shorted, and is covered above. If diode 315 fails in an open state, the potential charging circuit is interrupted. If resistor 305 fails in a shorted condition, there is no charging path because transistor 340 is open. If resistor 305 fails in a shorted condition, operation is not affected because transistor 340 is open. If resistor 310 fails to a shorted state, there is no charging path because transistor 340 is open. If resistor 310 fails open, there is no charging path.

It is thus apparent that no single component failure in the no-backup mode will result in Vbat 225 being inadvertently charged. This is a major advantage in terms of operational reliability and safety.

Transistor 325 and transistor 340 may be implemented by various means and structures, such as discrete components, substrate components, and integrated circuit implementations. Similarly, diode 315 and diode 320 may be implemented by various means, such as discrete components, substrate components, or internal to integrated circuits. Resistor 305 and resistor 310 may also be implemented by various techniques, such as discrete resistors, substrate resistors, integrated circuit resistors, or a semiconductor or other device operated in a resistive region. Those of ordinary skill in the art will appreciate that many other circuit and system configurations can be readily devised to accomplish the desired end without departing from the spirit of the present invention.

While the invention has been described in conjunction with specific embodiments, it is evident that many alternatives, modifications, permutations and variations will become apparent to those of ordinary skill in the art in light of the foregoing description. By way of example, other types of devices may be utilized for any component as long as they provide the requisite functionality. Accordingly, it is intended that the present invention embrace all such alternatives, modifications and variations as fall within the scope of the appended claims.

What is claimed is:

1. A battery protection structure, comprising:
   a low voltage drop element coupled to a battery voltage source;
   a charging limiting element controlled by a plurality of control signals and being coupled to the low voltage drop element and an output voltage to be supplied to a load;
   wherein during a normal operating mode during which the battery voltage source is not supplying power to the load and a primary voltage source is supplying power to the load, the battery charging limiting element and the voltage drop restricting element operate to prevent charging of the battery beyond a predetermined threshold; and
   wherein during a backup operating mode the battery voltage source supplies power to the load, and during which the primary voltage source does not supply power to the load, the low voltage drop restricting element may be chosen to reduce voltage drop between the battery voltage source and the load and wherein a voltage drop in the path of the battery during the backup operating mode is set by selecting a resistance value in the low voltage drop element.

2. The battery protection structure of claim 1, wherein a battery charging current is limited by the sum of a first selected resistance value in the low voltage drop element and a second selected resistance value in the charging limiting element.

3. The battery protection structure of claim 1, wherein a single component failure, during normal operation, in the low voltage drop element or the charging limiting element will not result in battery overcharging.

4. The battery protection structure of claim 1, wherein the charging limiting element provides different resistances in the normal and backup operating modes of operation.

5. The battery protection structure of claim 1, wherein the plurality of control inputs to the charging limiting element serves to select between normal operating mode, backup operating mode, and a charging operating mode.

6. The battery protection structure of claim 1, wherein the plurality of control inputs is chosen to allow design of the low voltage drop elements and the charging limiting element such that a single component failure does not result in excessive battery charging.

7. A battery protection structure, comprising:
   a first resistor, receiving power from a battery source;
   a second resistor, coupled to the battery source;
   a first transistor, with drain coupled to the first resistor and the second resistor, and well coupled to the second resistor;
   a first diode, with cathode coupled to the first transistor well and anode coupled to the first transistor source;
   a second diode, with anode coupled to the first transistor source;
   a second transistor, with drain coupled to the first transistor source, well coupled to the second diode cathode and to the second transistor source and to an input power source and to an output and to a load;
   a first control signal coupled to the first transistor gate, and
   a second control signal coupled to the second transistor gate.

8. The battery protection structure of claim 7, wherein the states of the first control signal and the second control signal function to allow power from the battery source to be applied to the output and the load, through the first resistor.

9. The battery protection structure of claim 7, wherein the states of the first control signal and the second control signal function to allow charging of the battery source from the input power source, through the first resistor and the second resistor.

10. The battery protection structure of claim 7, wherein the value of the first resistor determines the voltage drop from the battery source to the output and load, when the battery source is delivering power to the output and load.

11. The battery protection structure of claim 7, wherein the summed values of the first resistor and the second resistor determine the charging current limit when the battery source is being charged.

12. The battery protection structure of claim 7, wherein no single component failure will result in an overcharging condition of the battery source.

13. A battery protection apparatus, operable to supply battery backup power or to provide backup battery charging, comprising:
   means for reducing voltage drop when in backup operation;
   means for limiting battery charging current when in battery charging operation; and
   means for allowing single component failure without battery overcharging when in normal operation, wherein during normal operation the means for allowing single component failure prevents battery overcharging in response to a single component failure.

14. A battery protection structure capable of protecting a battery source from overcharging in normal operation and capable of providing backup power with low voltage drop, comprising:

a first resistor the value of which determines the voltage drop during backup operation;

a second resistor the value of which, when summed with the first resistor value, determines battery source charging current; and a plurality of control inputs that allow said structure to have bidirectional resistance characteristics that accommodate normal and backup operations.

* * * * *

UNITED STATES PATENT AND TRADEMARK OFFICE
CERTIFICATE OF CORRECTION

PATENT NO.        : 7,327,544 B2                                        Page 1 of 1
APPLICATION NO. : 10/890964
DATED             : February 5, 2008
INVENTOR(S)       : David C. McClure and William A. Bishop It is certified that error appears in the above-identified patent and that said Letters Patent is hereby corrected as shown below:

On title page, item [76]

Second listed inventor William D. Bishop should be corrected to read William A. Bishop Signed and Sealed this Third Day of June, 2008

JON W. DUDAS
*Director of the United States Patent and Trademark Office*